(12) United States Patent
Hirose et al.

(10) Patent No.: US 9,596,374 B2
(45) Date of Patent: Mar. 14, 2017

(54) IMAGE READING APPARATUS, IMAGE READING METHOD, AND STORAGE MEDIUM

(71) Applicant: CANON KABUSHIKI KAISHA, Tokyo (JP)

(72) Inventors: Ayako Hirose, Kawasaki (JP); Isao Migishima, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/679,130

(22) Filed: Apr. 6, 2015

(65) Prior Publication Data

US 2015/0288845 A1 Oct. 8, 2015

(30) Foreign Application Priority Data

Apr. 7, 2014 (JP) .................................. 2014-078448

(51) Int. Cl.
*H04N 1/203* (2006.01)
*H04N 1/03* (2006.01)
*H04N 1/21* (2006.01)

(52) U.S. Cl.
CPC ............ *H04N 1/2034* (2013.01); *H04N 1/03* (2013.01); *H04N 1/203* (2013.01); *H04N 1/2032* (2013.01); *H04N 1/21* (2013.01); *H04N 1/2104* (2013.01)

(58) Field of Classification Search
CPC ...... H04N 1/2034; H04N 1/03; H04N 1/2104; H04N 1/203; H04N 1/2032; H04N 1/21
USPC ............ 358/450, 400, 498; 399/67; 349/114
See application file for complete search history.

(56) References Cited

U.S. PATENT DOCUMENTS

| 5,689,347 | A | * | 11/1997 | Naoi | ...................... H04N 1/203 358/444 |
| 2009/0316166 | A1 | * | 12/2009 | Kubo | ................... H04N 1/4097 358/1.9 |

FOREIGN PATENT DOCUMENTS

JP H08-22536 A 1/1996

\* cited by examiner

*Primary Examiner* — Quang N Vo

(74) *Attorney, Agent, or Firm* — Canon USA, Inc. I.P. Division

(57) ABSTRACT

An image reading apparatus includes a front surface reading sensor configured to read a front surface of a document, a rear surface reading sensor configured to read a rear surface of the document, a storage control unit configured to store image data of the front surface of the document read by the front surface reading sensor and image data of the rear surface of the document read by the rear surface reading sensor, and an encoding unit configured to encode image data of the paired front and rear surface images based on the image data of the front surface and the image data of the rear surface.

12 Claims, 17 Drawing Sheets

IMAGE READING APPARATUS, IMAGE READING METHOD, AND STORAGE MEDIUM

BACKGROUND OF THE INVENTION

Field of the Invention

The present invention relates to image reading apparatuses configured to store simultaneously-read images of front and rear surfaces of a document as a single file in a memory.

Description of the Related Art

Techniques for simultaneously reading front and rear surfaces of a document and creating a single file are known. Japanese Patent Application Laid-Open No. 8-022536 discusses a technique for simultaneously reading front and rear surfaces of a document and creating a single file, and image data of the front and rear surfaces are stored in different buffers and the stored image data are encoded by an encoding apparatus.

More specifically, the image data of the read front surface is temporarily stored in a buffer memory 16 of a system main unit 3, and the image data of the read rear surface is stored in a buffer memory 10 having a capacity corresponding to one document page. Then, a data compression/decompression processing unit 17 compresses the image data temporarily stored in the buffer memory 16 and stores the compressed image data in a central processing unit (CPU) bus memory 15. Thereafter, image information about the rear surface stored in the buffer memory 10 is read by the buffer memory 16 and the data compression/decompression processing unit 17 performs data compression.

However, according to the technique discussed in Japanese Patent Application Laid-Open No. 8-022536, the image data of the rear surface stored in the buffer memory 10 is encoded after the image data of the front surface stored in the buffer memory 16 is encoded. This requires twice as much time for the encoding, resulting in a longer processing time. Thus, according to the conventional technique, encoding efficiency becomes low.

Furthermore, the technique discussed in Japanese Patent Application Laid-Open No. 8-022536 requires two buffers, the buffer memories 16 and 10 for separately storing the image data of the front and rear surfaces. Thus, the conventional technique also involves high cost.

SUMMARY OF THE INVENTION

The present invention is directed to image reading apparatuses, image reading methods, and programs for simultaneously reading front and rear surfaces of a document to create a single file in a reduced processing time at low cost.

According to an aspect of the present invention, an image reading apparatus includes a front surface reading sensor configured to read a front surface of a document, a rear surface reading sensor configured to read a rear surface of the document, a storage control unit configured to store image data of the front surface of the document read by the front surface reading sensor and image data of the rear surface of the document read by the rear surface reading sensor, and an encoding unit configured to encode image data of the paired front and rear surface images based on the image data of the front surface and the image data of the rear surface.

Further features of the present invention will become apparent from the following description of exemplary embodiments (with reference to the attached drawings).

DESCRIPTION OF THE EMBODIMENTS

Various exemplary embodiments of the invention will be described in detail below with reference to the drawings. It is to be understood that, unless otherwise specified, the relative positions of components and the like described in the exemplary embodiments are not intended to limit the scope of the invention.

Figure 1:
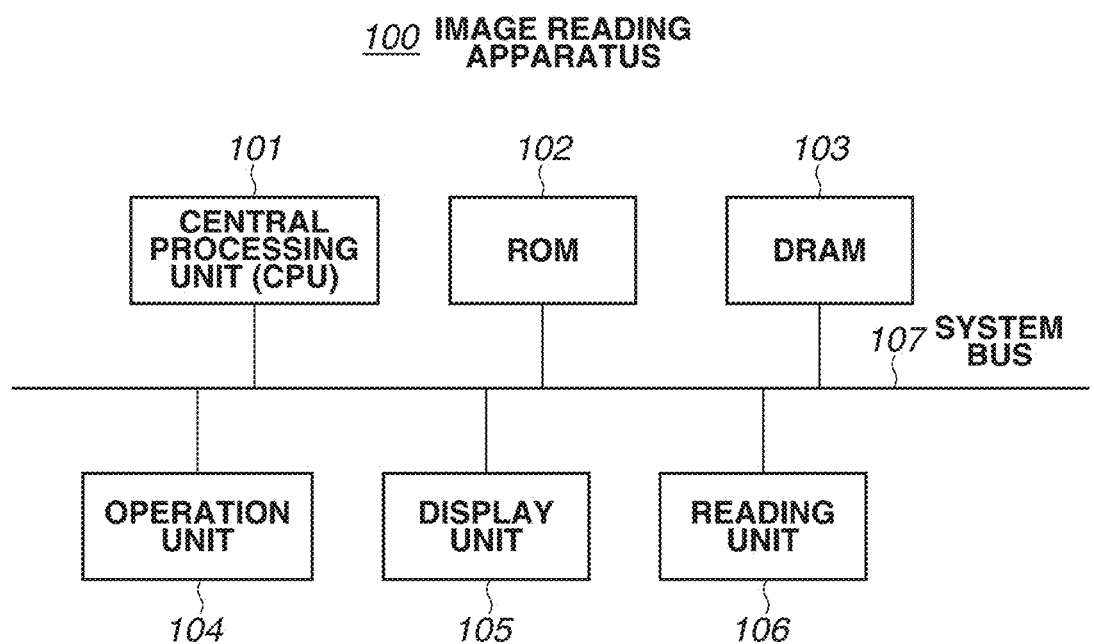
FIG. 1 is a block diagram illustrating an example of the configuration of an image reading apparatus according to a first exemplary embodiment.

The following describes a first exemplary embodiment. FIG. 1 is a block diagram illustrating an example of the configuration of an image reading apparatus 100 according to the first exemplary embodiment of the present invention.

The image reading apparatus 100 is an apparatus configured to read the front and rear surfaces of a document at one time by use of different reading sensors in one document conveying process. Further, the image reading apparatus 100 includes a central processing unit (CPU) 101, a read-only memory (ROM) 102, a storage unit (dynamic random access memory (DRAM)) 103, an operation unit 104, a display unit 105, a reading unit 106, and a system bus 107.

Figure 9:
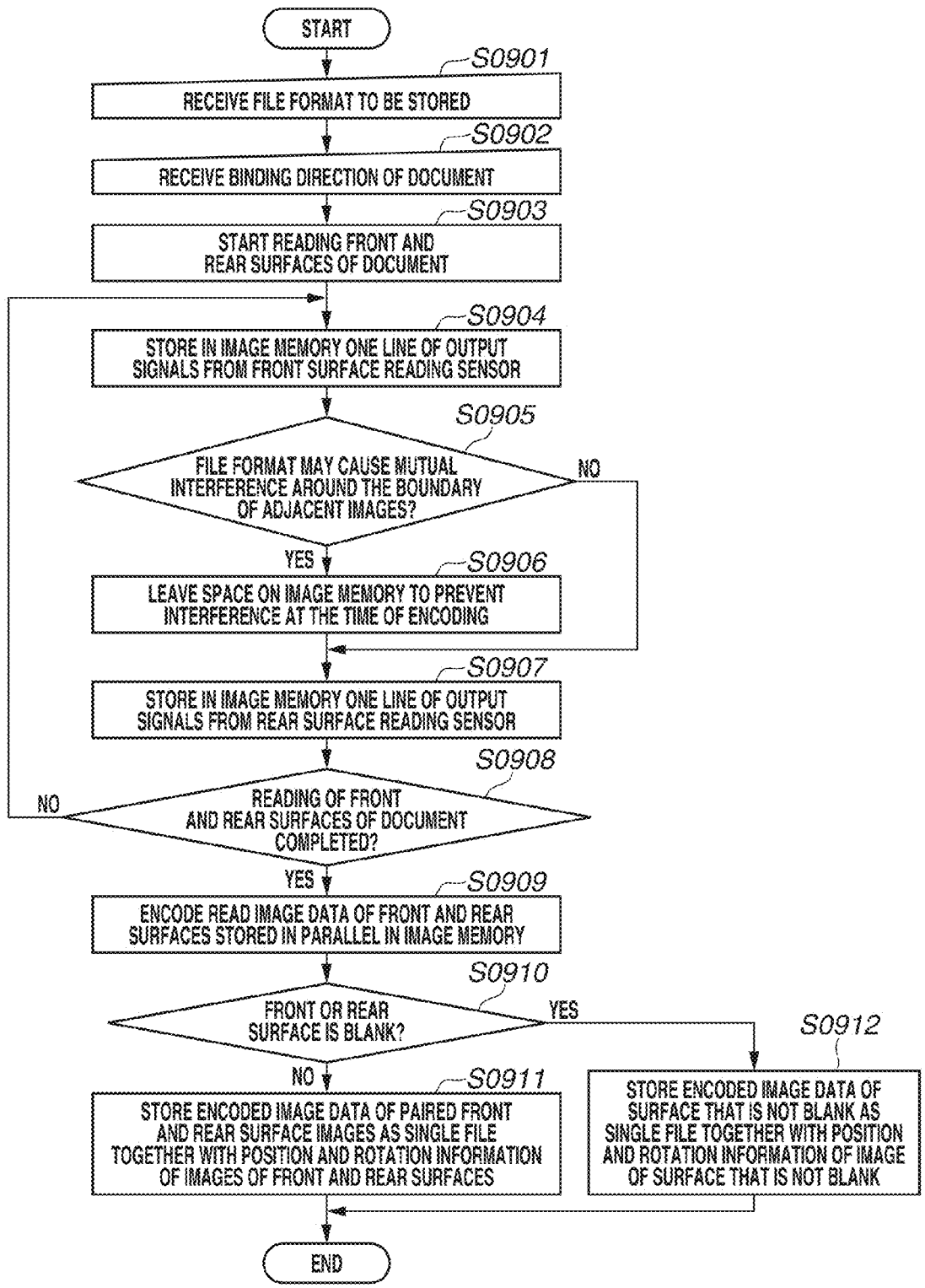
FIG. 9 is a flow chart illustrating a procedure for reading a document.
Figure 10:
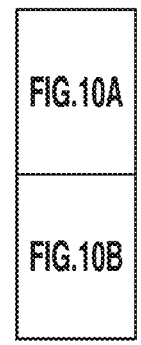
FIGS. 10, 10A and 10B are a flow chart illustrating a procedure for reading a document.

The CPU 101 comprehensively controls the individual components connected to the system bus 107 and executes various programs on the storage unit 103 serving as a working memory, thereby controlling the image reading apparatus 100. Programs such as those illustrated in a flow chart of FIG. 9 or 10, are stored in the ROM 102.

The operation unit 104 is an operation device such as keys or a touch panel. A user operates the operation unit 104 and a user instruction is input to the CPU 101. The display unit 105 displays various types of screen information about graphics, messages, and menus under the control of the CPU 101. The reading unit 106 reads the front and rear surfaces of a document in one document conveying process. The system bus 107 is used in data communication among the individual components of the image reading apparatus 100.

Figure 2:
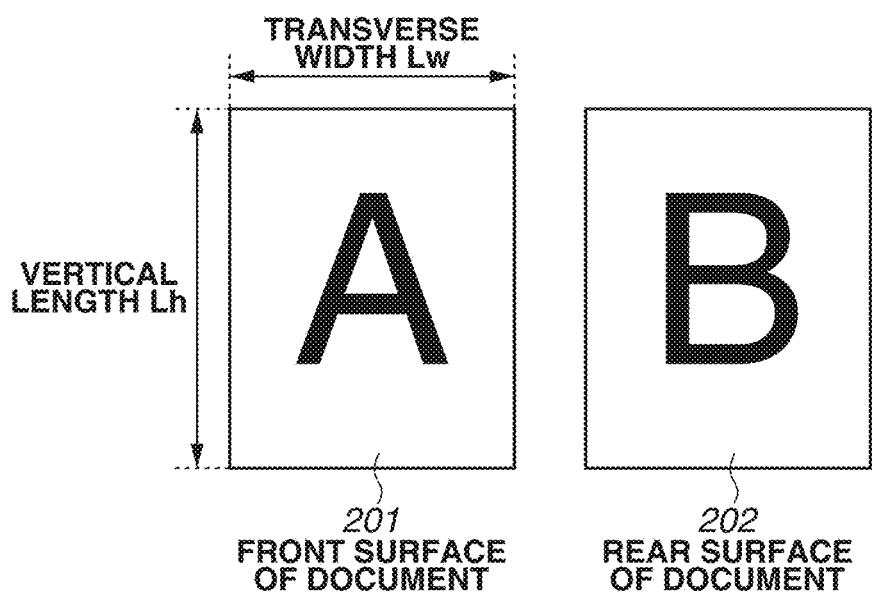
FIG. 2 illustrates a document to be used in the image reading apparatus.

FIG. 2 illustrates a document to be used in the image reading apparatus 100.

A document 200 includes a front surface 201 of the document and a rear surface 202 of the document and has a vertical length Lh and a transverse width Lw.

Figure 3:
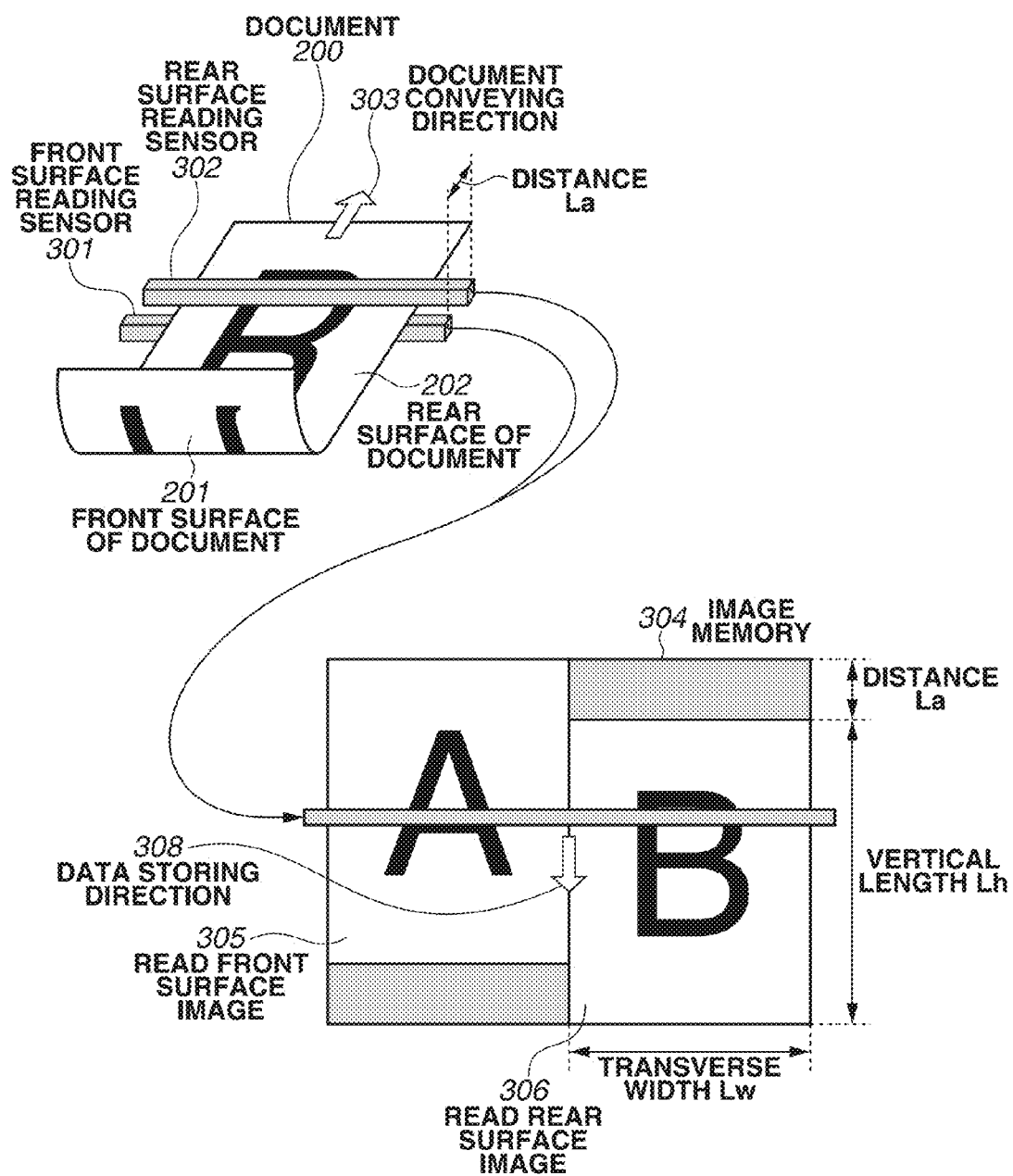
FIG. 3 illustrates how front and rear surfaces of a document are read and the images are stored in an image memory.

FIG. 3 illustrates an operation for storing image data acquired by reading the front and rear surfaces of the document 200 in the image memory 304.

A front surface reading sensor 301 configured to read the front surface 201 of the document and a rear surface reading sensor 302 configured to read the rear surface 202 of the document are provided. The document 200 is conveyed along a document conveying direction 303.

The front surface reading sensor 301 is disposed to face the front surface 201 of the document, and the rear surface reading sensor 302 is disposed to face the rear surface 202 of the document. Further, the position of the front surface reading sensor 301 is shifted forward in the document conveying direction 303 by a distance La from the rear surface reading sensor 302.

This is because, in a case where the front surface reading sensor 301 and the rear surface reading sensor 302 are disposed to face each other across the document 200, a part of light emitted by the front surface reading sensor 301 transmits through the document 200 and changes to light which contains image information described on the front surface 201 of the document. This transmission light influences (interferes) a read rear surface image 306 to be detected by the rear surface reading sensor 302. Similarly, in a case where the front surface reading sensor 301 and the rear surface reading sensor 302 are disposed to face each other across the document 200, a part of light emitted by the rear surface reading sensor 302 transmits through the document 200 and changes to light which contains image information described on the rear surface 202 of the document. This transmission light influences (interferes) a read front surface image 305 to be detected by the front surface reading sensor 301. To prevent the influence (interference) due to such an arrangement in which the front surface reading sensor 301 and the rear surface reading sensor 302 are disposed to face each other across the document 200, the position of the front surface reading sensor 301 is shifted forward in the document conveying direction 303 by a distance La from the rear surface reading sensor 302.

While the position of the front surface reading sensor 301 is shifted forward in the document conveying direction 303 by a distance La from the rear surface reading sensor 302 according to the present exemplary embodiment, alternatively, the position of the front surface reading sensor 301 may be shifted backward. Further, the distance La is a predetermined distance on the image memory 304 that is determined as necessary. That is, the front surface reading sensor 301 and the rear surface reading sensor 302 are disposed as illustrated in FIG. 3 to read the front and rear surfaces of the document in one document conveyance.

Each image data output from the front surface reading sensor 301 and from the rear surface reading sensor 302 is stored in the image memory 304. The read front surface image 305 is an image output from the front surface reading sensor 301, and the read rear surface image 306 is an image output from the rear surface reading sensor 302. Further, a data storing direction 308 is the direction in which image data is stored.

As described above, the position of the front surface reading sensor 301 is shifted forward in the document conveying direction 303 by the distance La from the rear surface reading sensor 302. Thus, if data simultaneously output from the two sensors 301 and 302 is arranged next to each other without change and stored in the image memory 304, the read front surface image 305 and the read rear surface image 306 are stored next to each other in parallel in such a state that the read front surface image 305 and the read rear surface image 306 are shifted by the distance La in the data storing direction 308. More specifically, the individual data of the front and rear surfaces is stored in units of lines at consecutive addresses on the image memory such that each line of the front and rear surface data is interleaved.

Figure 16:
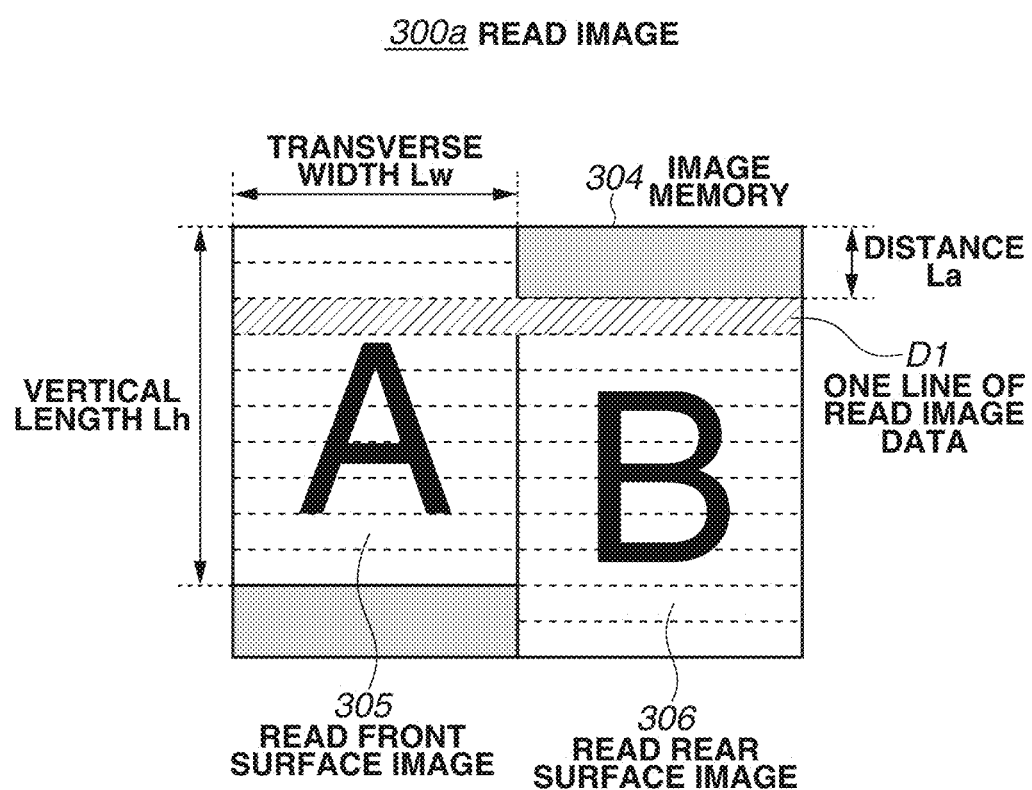
FIG. 16 illustrates lines of data of front/rear surfaces arranged next to each other.

FIG. 16 illustrates the state in which each line of front and rear surface data is arranged next to each other.

As illustrated in FIG. 16, one line of data of the front surface and one line of data of the rear surface are consecutively arranged next to each other on the image memory and form one line of read image data D1. In FIG. 16, the one line of read image data D1 is indicated with oblique lines. In FIG. 16, each area segmented by dotted lines indicates one line. The address of the read front surface image 305 within the one line of read image data D1 and the address of the read rear surface image 306 within the one line of read image data D1 are consecutively placed. In this manner, individual lines of the front and rear surface data are stored in units of lines at consecutive addresses on the image memory such that individual lines of the data are interleaved.

More specifically, the CPU 101 may store in one image memory 304 a first predetermined line of the image data of the document 200 read by the front surface reading sensor 301 in association with a second predetermined line of the image data of the document 200 read by the rear surface reading sensor 302. That is to say, the CPU 101 may control the storing so as to store in one image memory the first predetermined line of the image data of the document 200 read by the front surface reading sensor 301 in association with the second predetermined line of the image data of the document 200 read by the rear surface reading sensor 302. Since the image data only needs to be associated and stored in the foregoing way, individual lines of the front and rear surface data do not have to be interleaved.

The following describes a procedure for reading the document 200 using the image reading apparatus 100.

FIG. 9 is a flow chart illustrating the procedure for reading the document 200 using the image reading apparatus 100. The CPU 101 reads from the memory a program relating to the process of the flow chart and executes the program to realize the flow chart to be executed by the image reading apparatus 100 according to the exemplary embodiment of the present invention.

First, in step S0901, the image reading apparatus 100 receives a file format to be stored. In step S0902, the image reading apparatus 100 receives a binding direction of the document 200. In step S0903, the image reading apparatus 100 starts reading front and rear surfaces of the document 200. The binding direction may be long-side binding or short-side binding. In the long-side binding, documents are bound along the longer side of the pages of the documents, and when the document is longitudinally oriented, the pages are opened horizontally. In the short-side binding, documents are bound along the shorter side of the pages of the documents, and when the document is longitudinally oriented, the pages are opened vertically.

Then, in step S0904, the image reading apparatus 100 stores in the image memory 304 one line of output signals received from the front surface reading sensor 301. Next, in step S0905, the image reading apparatus 100 determines whether the file format input by the user may cause mutual interference around the boundary of adjacent images at the time of encoding.

For example, in a case of encoding in an encoding format that uses multiple adjacent pixels as a basic unit (hereinafter "MCU") in conversion processing, as performed in the Joint Photographic Experts Group (JPEG) format, mutual interference may occur around the boundary of adjacent images at the time of encoding. In this case, information associated with edge portions of the images influences surrounding margins, and if the images are encoded without having a space between the read front surface image 305 and the read rear surface image 306, mutual interference occurs around the boundary of the images and superimposes noise on the resulting image data.

In the case of the JPEG, if the transverse width Lw is a multiple of the MCU (the basic unit used in the conversion processing of multiple adjacent pixels), interference does not occur at the time of encoding. Thus, for example, Lb in FIG. 5 may be set to Lb=0. If the transverse width Lw is not a multiple of the MCU, Lb is set such that Lw+Lb is a multiple of the MCU. Alternatively, the distance Lb may be set to be equal to the MCU regardless of the transverse width Lw. A method for determining the distance Lb is not limited to the foregoing methods.

Figure 5:
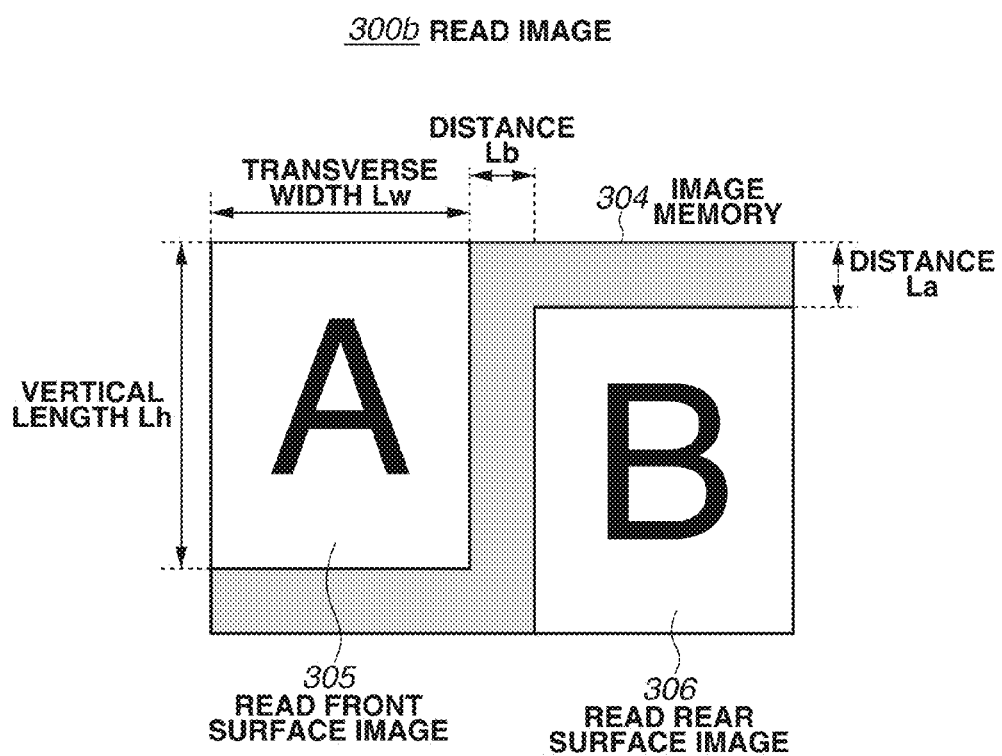
FIG. 5 illustrates a distance Lb between a read front surface image and a read rear surface image.

In step S0905, if the image reading apparatus 100 determines that the input file format may cause interference (YES in step S0905), the image reading apparatus 100 executes processing for preventing images around the boundary of the read front surface image 305 and the read rear surface image 306 from interfering with each other at the time of encoding. More specifically, in step S0906, the image reading apparatus 100 leaves a space (distance Lb) on the image memory 304 to prevent interference (superimposition of noise on the image data). That is, as illustrated in FIG. 5, the distance Lb is provided as the space between the read front surface image 305 and the read rear surface image 306 on the image memory 304. At this time, the distance Lb is determined such that the sum of the transverse width Lw and the distance Lb of the image data of the front surface is a multiple of the MCU (the basic unit used in the conversion processing of multiple adjacent pixels).

The following describes in detail the processing performed in step S0906. For example, in a case where an end position of the image data of the front surface in the main scanning direction is in the middle of the eighth MCU as illustrated in FIG. 16, up to the eighth MCUs are stored as the image data of the front surface. As a result, the image data of the front surface and a space exist in the eighth MCU. Then, the image data of the rear surface is stored from the position of an integral multiple of the ninth MCU, which is the subsequent MCU in the main scanning direction. In this way, the image data of the front surface and the image data of the rear surface can be prevented from being mixed in a single basic unit of the conversion processing. On the other hand, in step S0905, if the image reading apparatus 100 determines that the input file format may cause no interference (NO in step S0905), the processing proceeds to step S0907.

Specifically, in the case where the result of the determination in step S0905 is No, the image data of the front surface and the image data of the rear surface are stored without having a space between the image data of the front surface and the image data of the rear surface.

Then, in step S0907, the image reading apparatus 100 stores in the image memory 304 one line of output signals from the rear surface reading sensor 302 while maintaining the distance Lb. Next, in step S0908, the image reading apparatus 100 determines whether the reading of the front and rear surfaces of the document 200 is completed.

In step S0908, if the image reading apparatus 100 determines that the reading of the front and rear surfaces of the document 200 is completed (YES in step S0908), the processing proceeds to step S0909. On the other hand, if the image reading apparatus 100 determines that the reading is not completed (NO in step S0908), the processing returns to step S0904.

Figure 4:
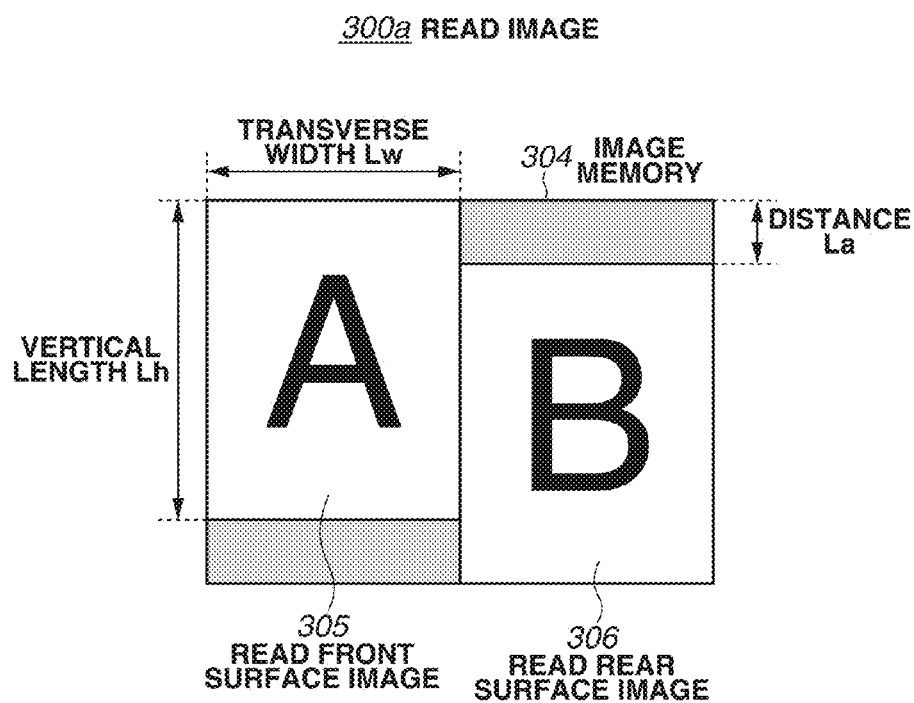
FIG. 4 illustrates a read image stored in an image memory.

FIG. 4 illustrates a read image 300a of the front and rear surfaces of the document 200 stored in the image memory 304 at the time of completion of the reading of the document 200 in the case where the input file format is determined to be unlikely to cause interference. As described above, the image data of the front surface and the image data of the rear surface are stored without having a space between the image data of the front surface and the image data of the rear surface.

On the other hand, FIG. 5 illustrates a read image 300b of the document 200 stored in the image memory 304 at the time of completion of the reading of the document 200 in the case where the input file format is determined in step S0905 to be likely to cause interference. As described above, the space Lb is provided between the read front surface image 305 and the read rear surface image 306 to prevent interference.

Figure 6:
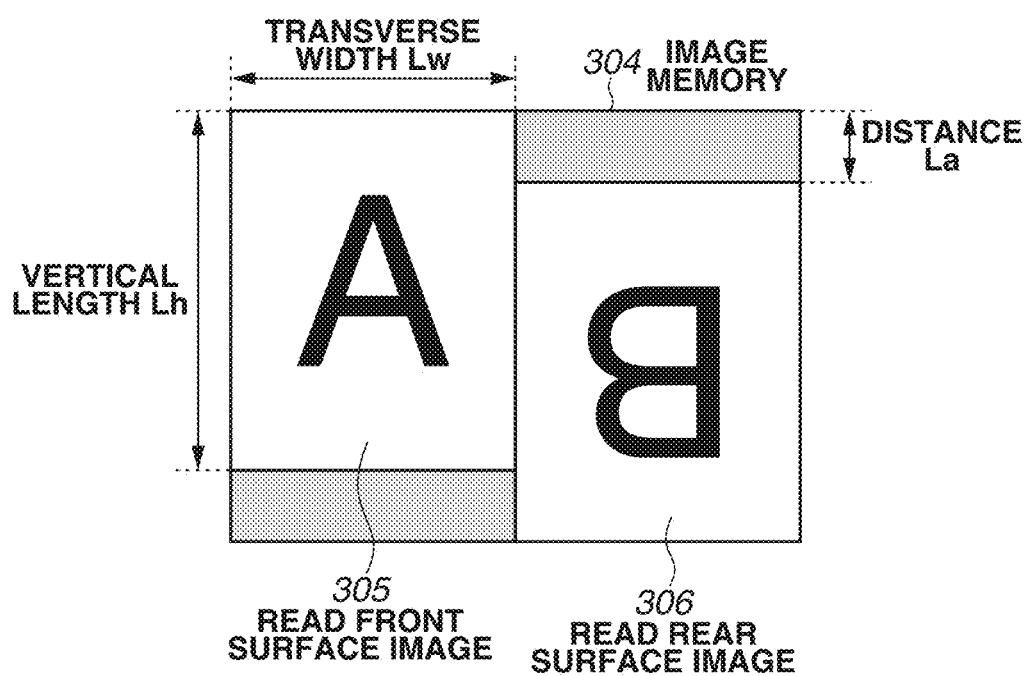
FIG. 6 illustrates a read image in a case where a top to bottom direction of a read rear surface image is upside-down.

FIG. 6 illustrates a read image 300c of the front and rear surfaces of the document 200 stored in the image memory 304 at the time of completion of the reading of the document 20 in the case where the a top to bottom direction of the read front surface image 305 and the read rear surface image 306 are upside-down.

Figure 7:
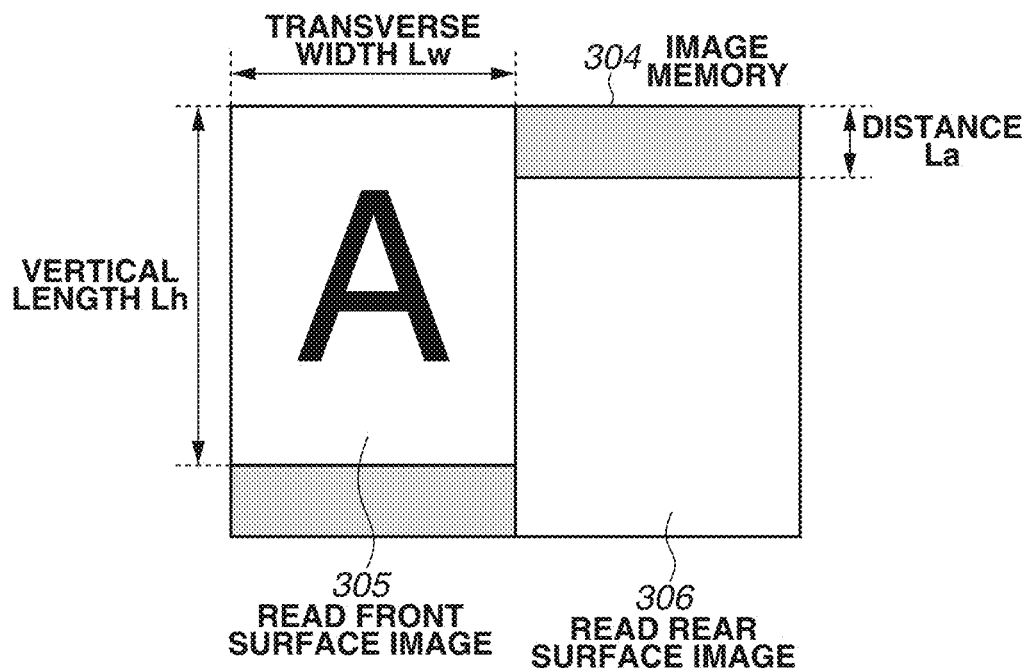
FIG. 7 illustrates a read document in a case where a rear surface of a document is blank.

FIG. 7 illustrates a read image 300d of the front and rear surfaces of the document 200 stored in the image memory 304 when the reading of the document 200 is completed in the case where the rear surface 202 of the document is blank.

In step S0909, after completing the reading of the front and rear surfaces of the document 200, the image reading apparatus 100 encodes the read image data stored in the image memory 304 as illustrated in FIGS. 4 to 7. More specifically, in step S0909, the image reading apparatus 100 encodes image data of the paired front and rear surface images based on the image data of the front and rear surfaces. Next, in step S0910, the image reading apparatus 100 determines whether the front or rear surface of the document 200 is blank.

In step S0910, if the image reading apparatus 100 determines that neither the front surface nor rear surface of the document 200 is blank or that both of the front and rear surfaces of the document 200 are blank (NO in step S0910), then in step S0911, the image reading apparatus 100 stores as a single file the image data of the paired front and rear surface images encoded in step S0909. When the processing of step S0911 is executed, position and rotation information about the images of the front and rear surfaces is stored together with the image data of the paired front and rear surface images.

The position information indicates the position of the read image. For example, the position information identifies the position of a reference point 1105 of the read front surface image or the position of a reference point 1106 of the read rear surface image as illustrated in FIG. 11 described below.

The rotation information indicates, for example, the angle at which the read rear surface image information 306 is rotated with respect to the read front surface image information 305. The rotation information may be considered as information indicating the angle at which the read front surface image information 305 is rotated with respect to the read rear surface image information 306. Further, the rotation information may be considered as information indicating the angle at which the read front surface image information 305 is rotated with respect to a specific reference point. Further, the rotation information may be considered as information indicating the angle at which the read rear surface image information 306 is rotated with respect to a specific reference point.

On the other hand, in step S0910, if the image reading apparatus 100 determines that one of the front and rear surfaces of the document 200 is blank (YES in step S0910), then in step S0912, the image reading apparatus 100 stores as a single file the image data of the surface that is not blank together with the position and rotation information of the image of the surface that is not blank. According to the present exemplary embodiment, the rotation angle of the read rear surface image 306 is determined based on the binding direction input in step S0902 and the result is stored as the rotation information, the top to bottom direction of the read image may be determined automatically based on the orientation of text on the document 200 and the result may be stored as the rotation information.

Figure 11:
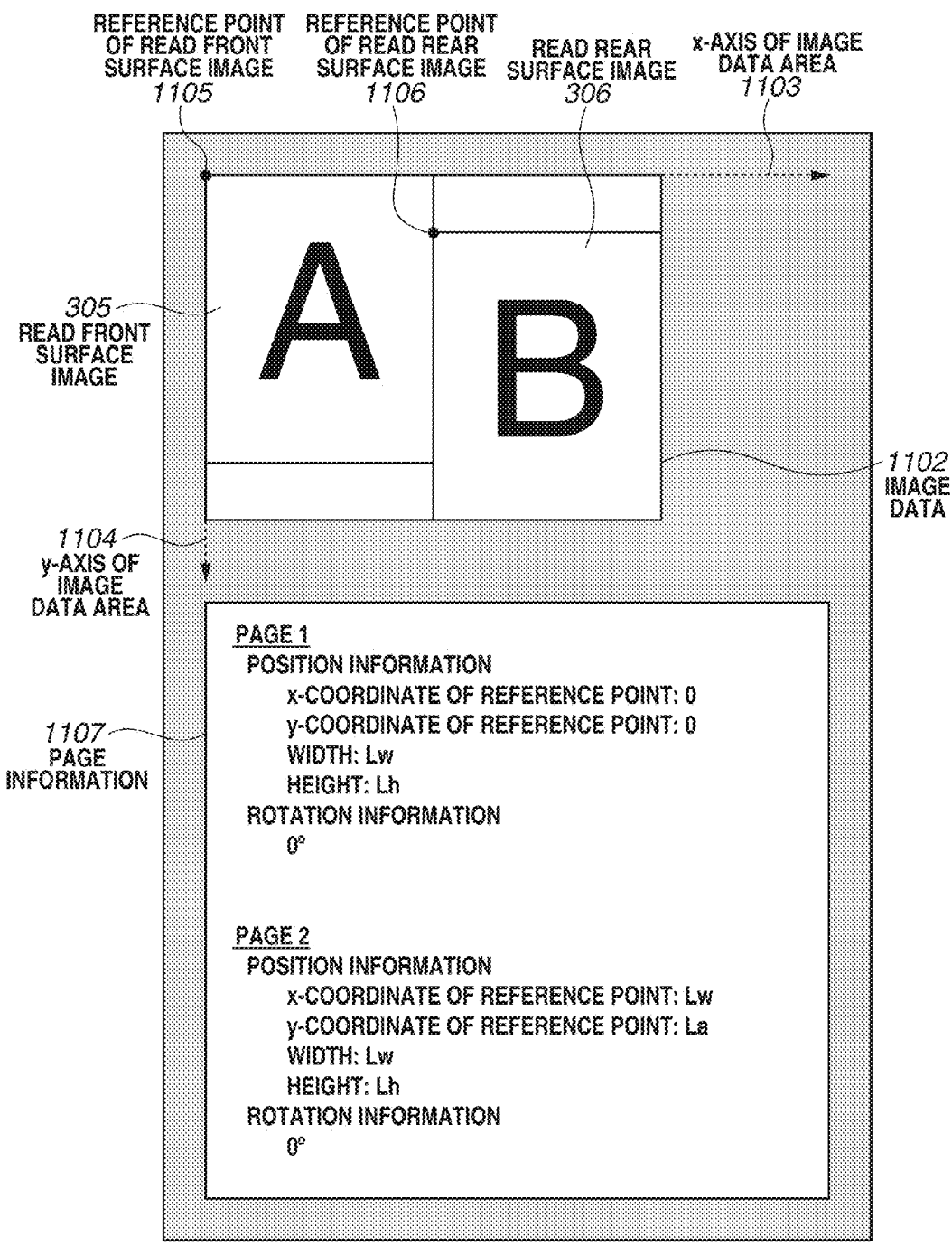
FIG. 11 illustrates a file created by encoding image data.

FIG. 11 illustrates a file 1101*a* created by encoding the image data 300*a* stored in the image memory 304 as illustrated in FIG. 4.

The file 1101*a* is created by encoding the image data 300*a* stored in the image memory 304 and contains encoded image data 1102 of the paired front and rear surface images and page information 1107. An x-axis 1103 is an x-axis of the image data 1102 area, and a y-axis 1104 is a y-axis of the image data 1102 area.

The page information 1107 is attached to the file 1101*a* and contains such information as the position and rotation information regarding an image on each page. In the present exemplary embodiment, the upper left of an image on each page is set as the reference point 1105 or 1106, and the coordinates of the reference points and the width and height of the image are retained as the position information of the image. A method for storing the position and rotation information of the image is not limited to that described in the present exemplary embodiment.

Figure 12:
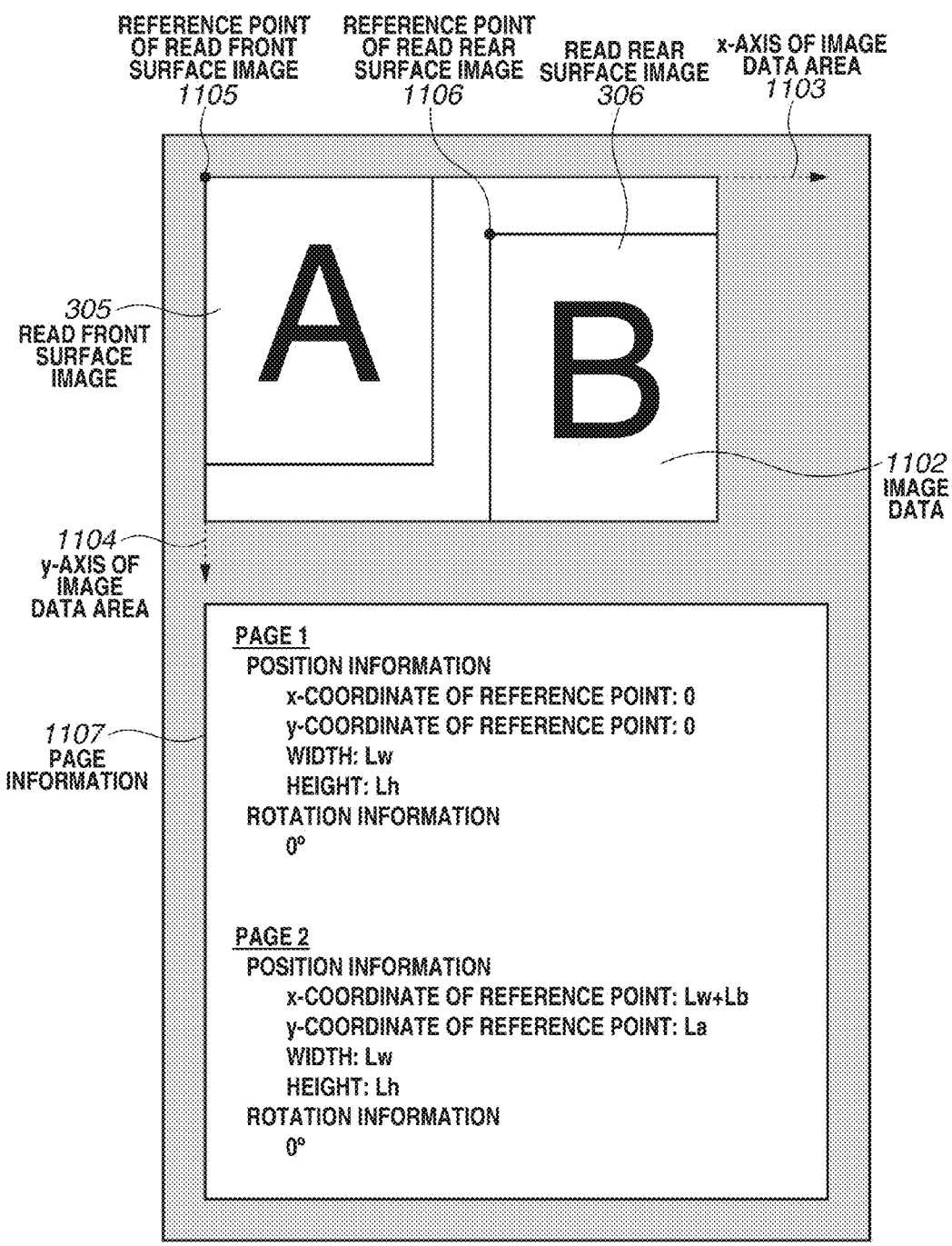
FIG. 12 illustrates a file created by encoding image data.

FIG. 12 illustrates a file 1101*b* created by encoding the image data 300*b* stored in the image memory 304 as illustrated in FIG. 5.

Figure 13:
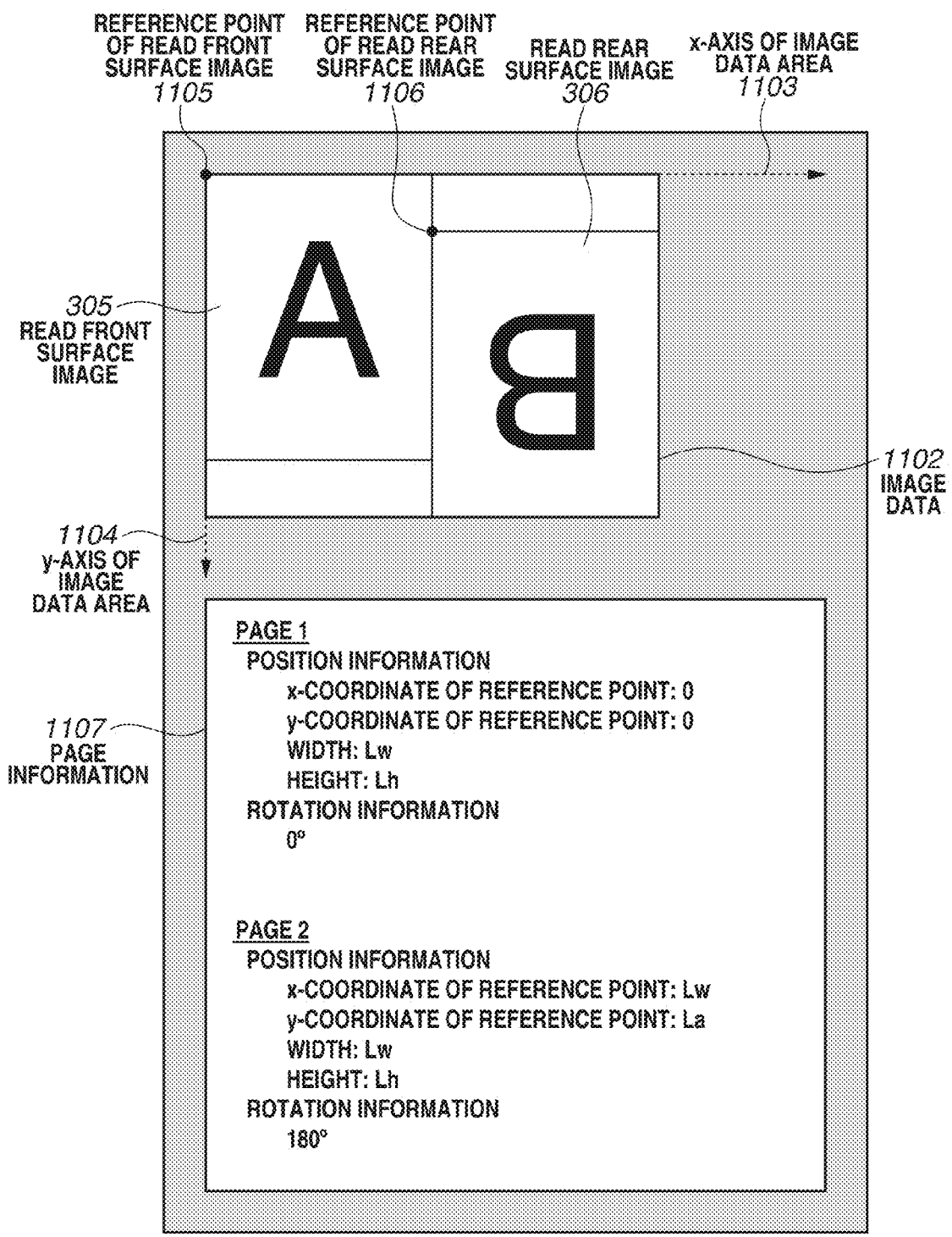
FIG. 13 illustrates a file created by encoding image data.

FIG. 13 illustrates a file 1101*c* created by encoding the image data 300*c* stored in the image memory 304 as illustrated in FIG. 6.

Figure 14:
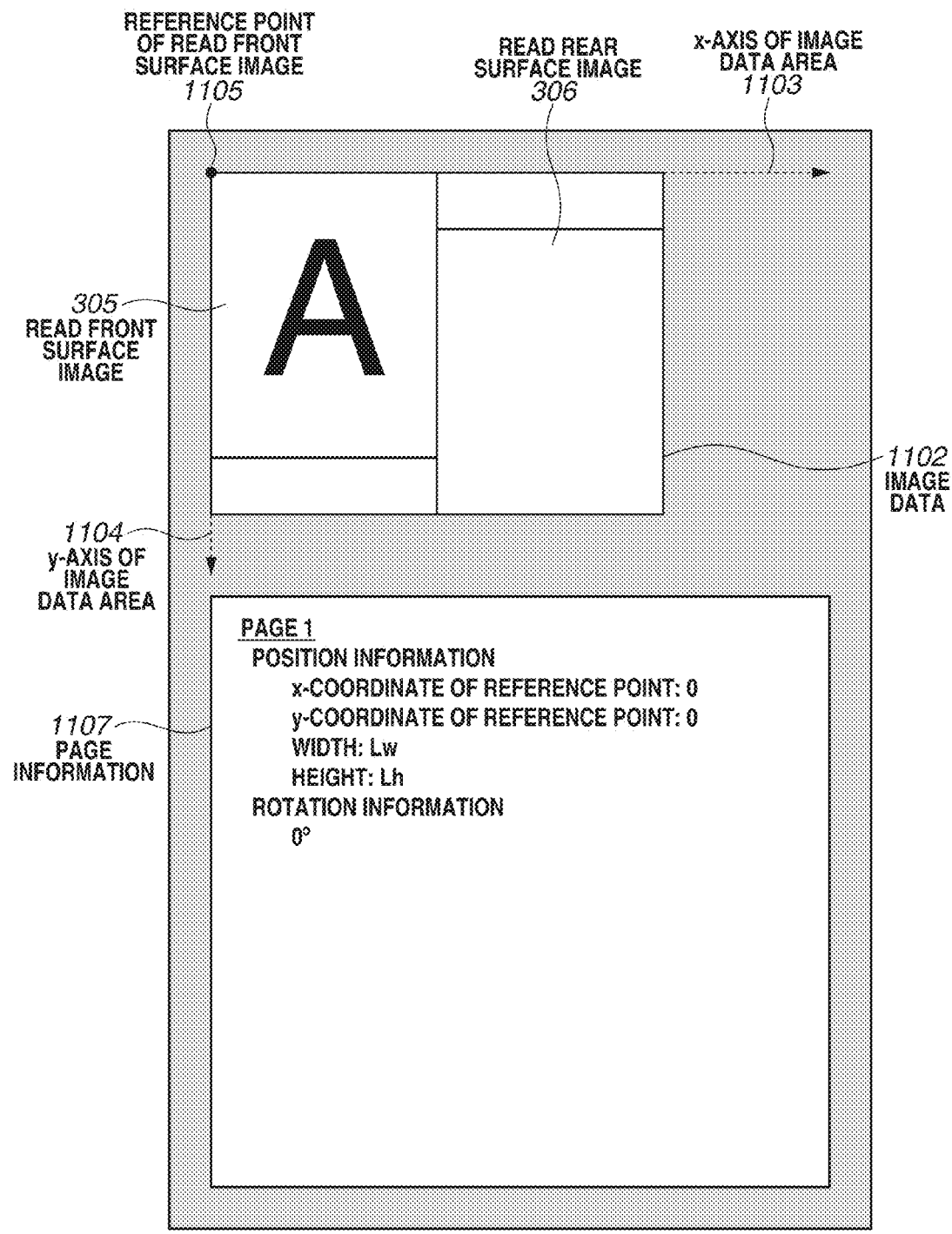
FIG. 14 illustrates a file created by encoding image data.

FIG. 14 illustrates a file 1101*d* created by encoding the image data 300*d* stored in the image memory 304 as illustrated in FIG. 7.

The following describes a procedure by which, when the document 200 is read using the image reading apparatus 100, a positional misalignment between the read front surface image 305 and the read rear surface image 306 is corrected and then stored in the image memory 304. Such positional misalignment is caused by the gap between the installed positions of the front surface reading sensor 301 and the rear surface reading sensor 302

Figure 10A:
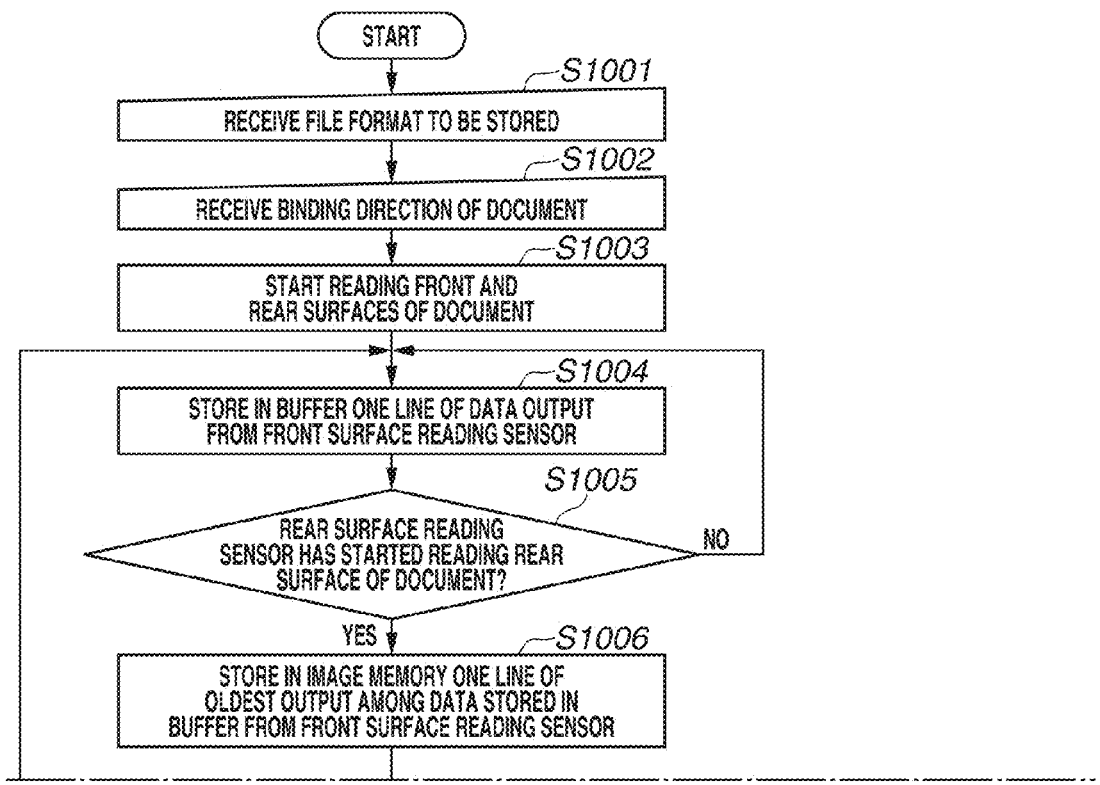
Figure 10B:
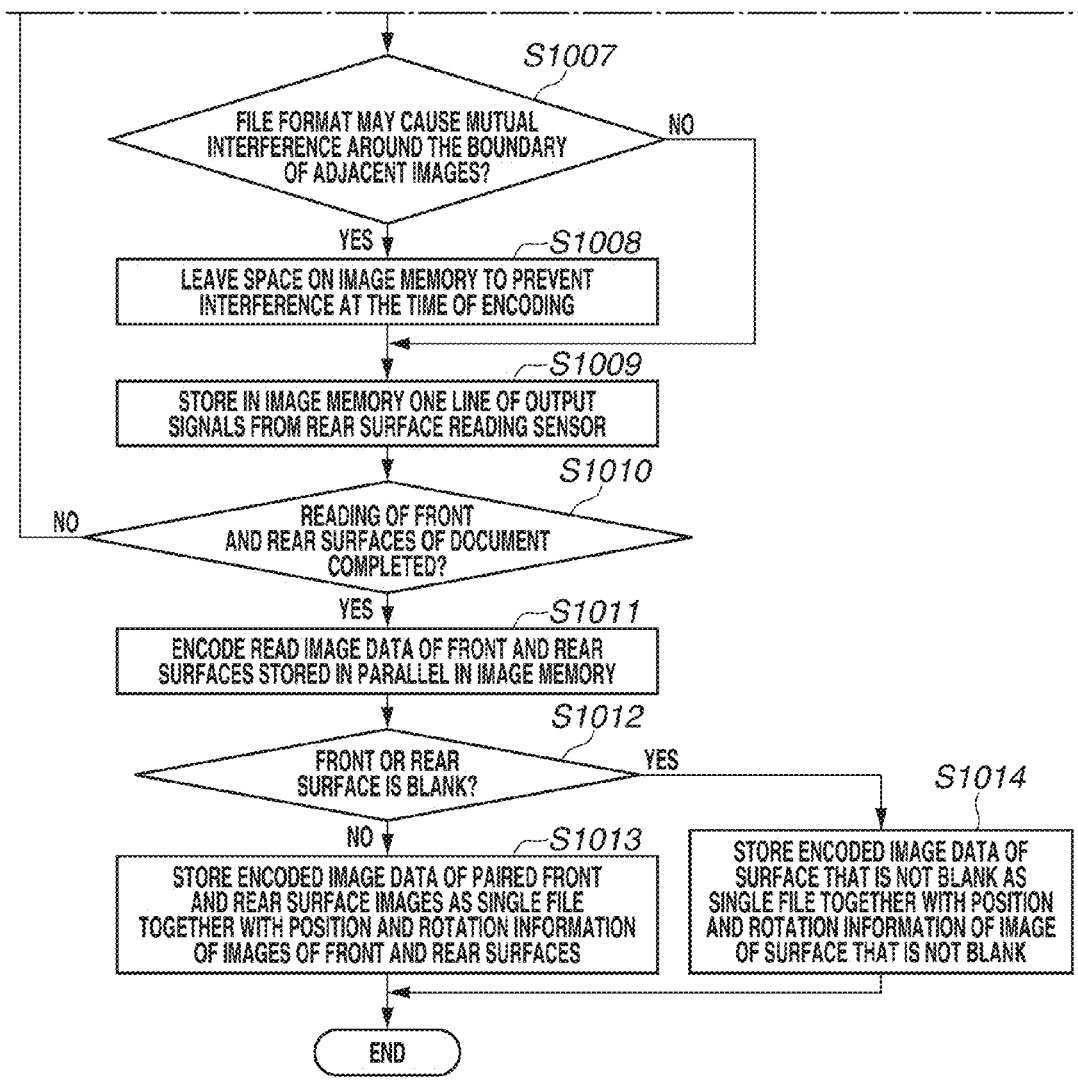

FIGS. 10A and 10B are a flow chart illustrating the procedure for reading the document 200 using the image reading apparatus 100.

In the flow chart in FIGS. 10A and 10B, steps S1005 and S1006 are added to the flow chart illustrated in FIG. 9 to eliminate a misalignment La on the image memory. More specifically, the image reading apparatus 100, which includes a buffer with enough capacity for storing data corresponding to La×Lw, temporarily stores data read by the sensor that reads data prior to another sensor in the buffer. The image reading apparatus 100 then reads the data line by line from the buffer and stores the data line by line in the image memory such that each line of the data align with its corresponding image position of data read subsequently by another sensor.

Steps S1001 to S1003 are similar to steps S0901 to S0903, so that description of steps S1001 to S1003 is omitted. In step S1004, the image reading apparatus 100 stores in the buffer one line of the data output from the front surface reading sensor 301. In FIG. 3, the buffer is a ring buffer capable of temporarily storing data of a range (La×Lw) which corresponds to the range of the gap between the front surface reading sensor 301 and the rear surface reading sensor 302 and is read by the front surface reading sensor 301 in advance. Next, in step S1005, the image reading apparatus 100 determines whether the rear surface reading sensor 302 has started reading the rear surface 202 of the document.

In step S1005, if the image reading apparatus 100 determines that the rear surface reading sensor 302 has started reading the rear surface 202 of the document (YES in step S1005), the processing proceeds to step S1006. On the other hand, if the image reading apparatus 100 determines that the rear surface reading sensor 302 has not started reading the rear surface 202 of the document (NO in step S1005), the processing proceeds to step S1004.

In step S1006, if the rear surface reading sensor 302 has already started reading the rear surface 202 of the document, the image reading apparatus 100 stores in the image memory 304 one line of the oldest output among the data stored in the buffer which is received from the front surface reading sensor 301.

Next, in step S1007, the image reading apparatus 100 determines whether the file format input by the user may cause mutual interference around the boundary of adjacent images at the time of encoding. Specifically, the image reading apparatus 100 determines whether the input file format is a JPEG format.

In step S1007, if the image reading apparatus 100 determines that the input file format may cause interference (YES in step S1007), then in step S1008, the image reading apparatus 100 leaves a space on the image memory 304 to prevent the mutual interference around the boundary of the read front surface image 305 and the read rear surface image 306 at the time of encoding. On the other hand, in step S1007, if the image reading apparatus 100 determines that the input file format may cause no interference (NO in step S1007), the processing proceeds to step S1009.

Then, in step S1009, the image reading apparatus 100 stores in the image memory 304 one line of output signals received from the rear surface reading sensor 302. In step S1010, the image reading apparatus 100 determines whether the reading of the front and rear surfaces of the document 200 has been completed.

In step S1010, if the image reading apparatus 100 determines that the reading of the front and rear surfaces of the document 200 has been completed (YES in step S1010), the processing proceeds to step S1011. On the other hand, if the image reading apparatus 100 determines that the reading of the front and rear surfaces of the document 200 has not been completed (NO in step S1010), the processing proceeds to step S1004.

Figure 8:
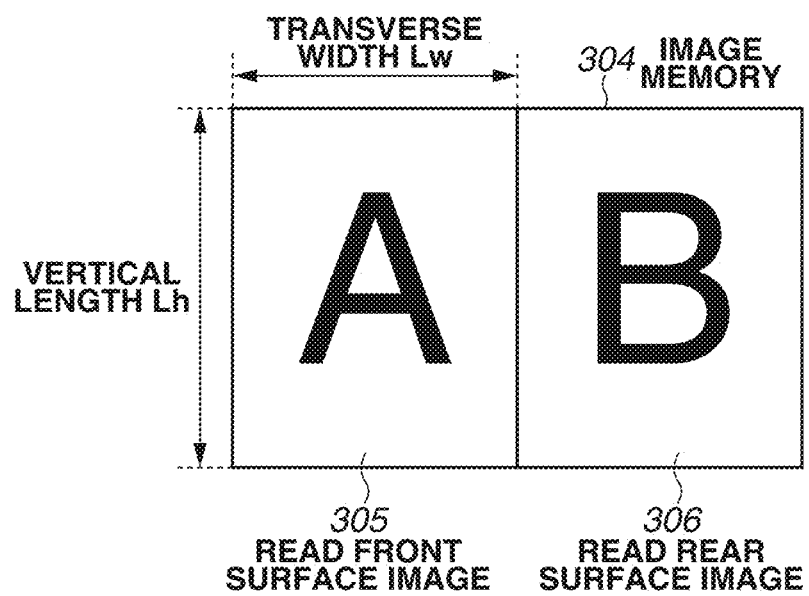
FIG. 8 illustrates images read in a file format that may cause no interference.

FIG. 8 illustrates a read image 300e of the front and rear surfaces of the document 200 stored in the image memory 304 at the time of completion of the reading of the document 200 in the case where the input file format is determined in step S1007 to be unlikely to cause interference.

Subsequent steps S1011 to S1014 are similar to steps S0909 to S1012 illustrated in FIG. 9, and description of steps S1011 to S1014 is omitted.

Figure 15:
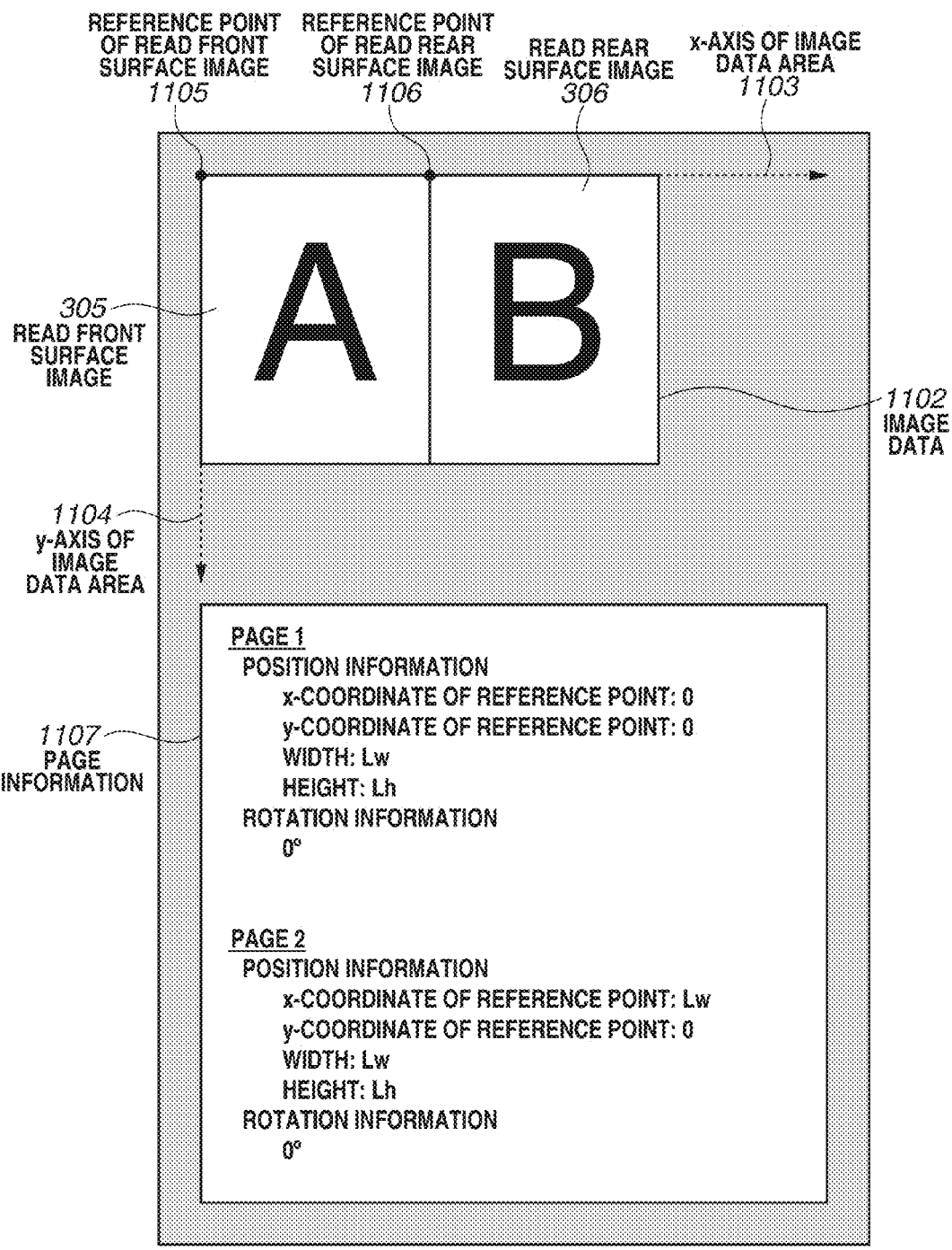
FIG. 15 illustrates a file created by encoding image data.

FIG. 15 illustrates a file 1101e created by encoding image data 300e stored in the image memory 304 as illustrated in FIG. 8.

Functions of the present exemplary embodiment can also be realized by the following configuration. Specifically, program codes for executing the processing of the image reading apparatus 100 of the present exemplary embodiment are supplied to a system or apparatus, and a computer (or CPU or micro processing unit (MPU)) of the system or apparatus executes the program codes to realize the functions. In this case, the functions of the present exemplary embodiment are realized by the program codes read from the storage medium and also by the storage medium storing the program codes.

Further, the program codes for realizing the functions of the present exemplary embodiment may be executed by a single computer (CPU, MPU) or a plurality of computers cooperating with each other. Further, the program codes may be executed by a computer, or hardware such as a circuit for realizing the functions of the program codes may be provided. Further, a part of the program codes may be realized by hardware while the remaining part is executed by a computer.

The exemplary embodiments of the present invention show an advantage that front and rear surfaces of a document can be read simultaneously to create a single file in a reduced processing time at low cost.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-078448 filed Apr. 7, 2014, which is hereby incorporated by reference herein in its entirety.

What is claimed is:

1. An image reading apparatus comprising:
   a front surface reading sensor configured to read a front surface of a document;
   a rear surface reading sensor configured to read a rear surface of the document;
   a storage control unit configured to store, in a same memory, image data of the front surface of the document read by the front surface reading sensor and image data of the rear surface of the document read by the rear surface reading sensor; and
   an encoding unit configured to perform encode processing on each basic unit in a pair image data of the front and rear surfaces generated by the image data of the front surface and the image data of the rear surface, wherein a file format of a file generated by the encoding unit is a predetermined file format having a possibility that mutual interference occurs around a boundary of a plurality of pixels adjacent to each other at the time of the encode processing,
   wherein the storage control unit stores image data of an end position of the image data of the front surface in the main scanning direction and a space in a first basic unit on the memory and stores image data of a start position of the image data of the rear surface in the main scanning direction in a second basic unit, different from the first basic unit, on the memory, for generating the file of the predetermined file format.

2. The image reading apparatus according to claim 1, wherein the storage control unit stores a second predetermined line of the image data of the document read by the rear surface reading sensor at an address that comes next to an address of a first predetermined line of the image data of the front surface of the document read by the front surface reading sensor.

3. The image reading apparatus according to claim 1, wherein the storage control unit determines, based on a format of a file created by the encoding unit, whether a space is provided between the image data of the front surface and the image data of the rear surface.

4. The image reading apparatus according to claim 1, further comprising a determination unit configured to determine whether a format of a file created by the encoding unit is the predetermined file format,
   wherein in a case where the determination unit determines that the format is the predetermined file format, the storage control unit stores the image data of the front surface and the image data of the rear surface providing a space between the image data of the front surface and the image data of the rear surface such that the image data of the front surface and the image data of the rear surface are not arranged to be mixed within a basic unit of conversion processing in the pair image data, and
   wherein in a case where the determination unit determines that the format is not the predetermined file format, the storage control unit stores the image data of the front surface and the image data of the rear surface without providing a space between the image data of the front surface and the image data of the rear surface.

5. An image reading method to be executed by an image reading apparatus, the image reading method comprising:
storing, in a same memory, image data of a front surface of a document read by a front surface reading sensor configured to read a front surface of a document and image data of a rear surface of the document read by a rear surface reading sensor configured to read a rear surface of a document; and
performing encoding processing on each basic unit in a pair image data cif image data of the front and rear surfaces generated by the image data of the front surface and the image data of the rear surface, wherein a file format of a file is a predetermined file format having a possibility that mutual interference occurs around a boundary of a plurality of pixels adjacent to each other at the time of the encoding processing,
storing image data of an end position of the image data of the front surface in the main scanning direction and a space in a first basic unit on the memory and stores image data of a start position of the image data of the rear surface in the main scanning direction in a second basic unit, different from the first basic unit, on the memory, for generating the file of the predetermined file format.

6. The image reading method according to claim 5, wherein a second predetermined line of the image data of the document read by the rear surface reading sensor is stored at an address that comes next to an address of a first predetermined line of the image data of the front surface of the document read by the front surface reading sensor.

7. The image reading method according to claim 5, further comprising determining, based on a format of a file created, whether a space is provided between the image data of the front surface and the image data of the rear surface.

8. The image reading method according to claim 5, further comprising determining whether a format of a file created by the encoding is the predetermined file format,
wherein in a case where it is determined that the format is the predetermined file format, the image data of the front surface and the image data of the rear surface are stored with a space provided between the image data of the front surface and the image data of the rear surface such that the image data of the front surface and the image data of the rear surface are not arranged to be mixed within a basic unit of conversion processing in the pair image data, and
wherein in a case where it is determined that the format is not the predetermined file format, the image data of the front surface and the image data of the rear surface are stored without having a space between the image data of the front surface and the image data of the rear surface.

9. A non-transitory storage medium storing a program to be executed in an image reading apparatus, the method comprising:
storing, in a same memory, image data of a front surface of a document read by a front surface reading sensor configured to read a front surface of a document and image data of a rear surface of the document read by a rear surface reading sensor configured to read a rear surface of a document; and
performing encoding processing on each basic unit in a pair image data of the front and rear surfaces generated by the image data of the front surface and the image data of the rear surface, wherein a file format of a file is a predetermined file format having a possibility that mutual interference occurs around a boundary of a plurality of pixels adjacent to each other at the time of the encoding processing,
storing image data of an end position of the image data of the front surface in the main scanning direction and a space in a first basic unit on the memory and stores image data of a start position of the image data of the rear surface in the main scanning direction in a second basic unit, different from the first basic unit, on the memory, for generating the file of the predetermined file format.

10. The non-transitory storage medium according to claim 9, wherein a second predetermined line of the image data of the document read by the rear surface reading sensor is stored at an address that comes next to an address of a first predetermined line of the image data of the front surface of the document read by the front surface reading sensor.

11. The non-transitory storage medium according to claim 9, further comprising determining, based on a format of a file created, whether a space is provided between the image data of the front surface and the image data of the rear surface.

12. The non-transitory storage medium according to claim 9, further comprising determining whether a format of a file created is the predetermined file format,
wherein in a case where it is determined that the format is the predetermined file format, the image data of the front surface and the image data of the rear surface are stored having a space between the image data of the front surface and the image data of the rear surface such that the image data of the front surface and the image data of the rear surface are not arranged to be mixed within a basic unit of conversion processing in the pair image data, and
wherein in a case where it is determined that the format is not the predetermined file format, the image data of the front surface and the image data of the rear surface are stored without having a space between the image data of the front surface and the image data of the rear surface.

* * * * *